(12) United States Patent
Armstrong et al.

(10) Patent No.: US 10,651,927 B2
(45) Date of Patent: May 12, 2020

(54) MULTICHANNEL SIGNAL MODULATOR FOR USE IN BROADCAST SATELLITE APPLICATIONS

(71) Applicant: SED SYSTEMS, a division of CALIAN LTD., Saskatoon (CA)

(72) Inventors: David Armstrong, Saskatoon (CA); Kendrick Hamilton, Saskatoon (CA); Seann Hamer, Saskatoon (CA)

(73) Assignee: SED SYSTEMS, A DIVISION OF CALIAN LTD., Saskatoon, Saskatchewan (CA)

( * ) Notice: Subject to any disclaimer, the term of this patent is extended or adjusted under 35 U.S.C. 154(b) by 227 days.

(21) Appl. No.: 15/053,764

(22) Filed: Feb. 25, 2016

(65) Prior Publication Data

US 2016/0248497 A1 Aug. 25, 2016

(30) Foreign Application Priority Data

Feb. 25, 2015 (CA) ...................................... 2883149

(51) Int. Cl.
*H04B 7/185* (2006.01)
*H04L 27/26* (2006.01)

(52) U.S. Cl.
CPC ..... *H04B 7/18523* (2013.01); *H04L 27/2627* (2013.01)

(58) Field of Classification Search
CPC .......................... H04B 7/18523; H04L 27/2627
See application file for complete search history.

(56) References Cited

U.S. PATENT DOCUMENTS

| 5,956,346 A * | 9/1999 | Levan | H04N 7/10 348/E7.049 |
|---|---|---|---|
| 7,830,217 B1 * | 11/2010 | Stein | H04L 27/365 332/103 |
| 2009/0290659 A1 * | 11/2009 | Petrovic | H04H 20/30 375/340 |
| 2012/0321010 A1 * | 12/2012 | Laudel | H04H 20/78 375/267 |

* cited by examiner

*Primary Examiner* — Anh Vu H Ly
*Assistant Examiner* — Hector Reyes
(74) *Attorney, Agent, or Firm* — Stites & Harbison, PLLC; Jeffrey A. Haeberlin

(57) ABSTRACT

A multichannel signal modulator for the generation of a multichannel signal for uplink to a broadcast satellite. Using a digital signal processing system to generate a multichannel signal from a plurality of source signals reduces substantially the quantity and complexity of a satellite uplink installation for use in such applications.

15 Claims, 8 Drawing Sheets

MULTICHANNEL SIGNAL MODULATOR FOR USE IN BROADCAST SATELLITE APPLICATIONS

BACKGROUND

This invention is in the field of broadcast satellite technology. More specifically the invention is an electronic apparatus for use in a satellite uplink facility capable of generating multiple satellite uplink signals using a single component.

BACKGROUND

Current satellite broadcast uplink facilities use multiple single channel modulators to generate the multiple carriers required by broadcast satellites. A typical conventional satellite uplink consists of multiple data sources feeding multiple single-channel modulators. The multiple outputs of these modulators are then typically converted from IF-frequency to L-band and summed using a combiner for further processing and uplink.

These conventional approaches to the generation of a multiple carrier have significant limitations related to cost and complexity. The use of multiple single channel modulators to generate the multiple carriers required in such a broadcasting application results in the use of significant quantities of complicated equipment, and the use of a plurality of components also results in the need for significant interconnection complexity.

Another limitation to current approaches includes even space requirements. The use of multiple single channel modulators consumes significant space in the compact areas making up a satellite uplink facility. If it were possible to reduce the space requirements for such uplink facilities and applications this would it is believed enhance commerciality of these types of hardware.

If it were possible to modify conventional hardware approaches to multiple carrier signal creation to reduce costs and complexity it is believed that this would be positively received in industry.

BRIEF SUMMARY

The invention is a multichannel signal modulator capable of generation of a multichannel signal of at a selected bandwidth from a plurality of source signals, using a single processing component. The multichannel signal modulator provides the ability to produce a multichannel signal with far less equipment overhead than current processes.

The invention, a multichannel signal modulator, accomplishes its objectives comprising firstly a plurality of signal inputs for reception of a corresponding plurality of source signals from signal sources. The multichannel signal modulator next includes a series of digital circuits in a signal assembly system which can process the incoming plurality of source signals into the multichannel signal at the selected bandwidth. The plurality of signal inputs pass the source signals to a modulation means, which in most cases comprises a plurality of modulator circuits corresponding to the plurality of signal inputs. Each modular circuit is capable of modulating a source signal. Following modulation of the related source signal in operation of the device, the source signal becomes a modulated signal. The plurality of modulated signals are then passed through a corresponding plurality of source upsampling circuits which will upsample the modulated signals to desired frequency or quality. Following the completion of the source upsampling, frequency mixing means is used to prepare the plurality of upsampled signals for placement in relation to each other in the final multichannel signal. The frequency mixing means also includes circuitry to combine the processed source signals at this stage into a unitary signal.

The unitary signal is then upsampled into the multichannel signal at the selected bandwidth etc. and output for downstream processing or transmission or uplink via a signal output.

In operation of the multichannel signal modulator the plurality of source signals are modulated by the modulation means before upsampling and mixing by the source upsampling means and the frequency mixing means respectively into a unitary signal which is formatted into the desired final multichannel signal at the selected bandwidth by the final upsampling means for output via the signal output.

The use of a single digital circuit combination to yield a component which can act as a multichannel signal modulator represents a significant improvement over current methods which comprise the use of separate components for each modulator circuit, each source upsampling circuit and the like.

Various types of specific circuit designs can be designed for each component of the signal assembly system and the multichannel signal modulator and any design which assists in the achievement of the general method outlined herein is contemplated within the scope of the present invention.

Each of the plurality of source signals might be at similar or different frequencies, and the circuitry of the signal assembly system can conform them as required.

The modulation step in respect of the source signals can comprise, in respect of each source signal, at least one of:
  grooming the source signal;
  application of forward error correction to the source signal;
  modulation of the source signal;
  pulse shaping of the source signal; or
  amplitude control of the source signal.

A timing control circuit could also be used in conjunction with the plurality of modulator circuits, to synchronize the modulation of the plurality of source signals. Various timing and synchronization methodologies will be understood to those skilled in the art of signal processing and circuit design and any such designs are contemplated within the scope of the present invention.

The multichannel signal is created digitally and can be output from the multichannel signal modulator is either digital format or could be converted to analog format if desired.

Following conversion to an analog signal for satellite uplink purposes further processing could also be applied to the multichannel signal including amplification, further frequency shifting or other steps and processes.

The multichannel signal modulator has many benefits beyond space savings. The multichannel signal modulator allows for tight control of frequency synchronization between the multiple source signals incorporated into the multichannel signal and also allows for timing control between the channels as they are all derived from a common reference source. The multichannel signal modulator also allows for control of the relative power between the multiple source signals and plurality of signal sources, as well as the overall absolute power output on the signal output from the multichannel signal modulator.

As outlined elsewhere herein, the multichannel signal modulator uses digital circuitry to generate the multichannel signal—although the circuitry is complex, it is simpler in terms of circuitry components required when compared to the quantity of circuits required in prior art approaches using multiple single channel modulator 106 equipment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

The invention is a multichannel signal modulator which represents an an enhancement over the state of the art in the field of multichannel signal processing for use satellite broadcasting uplink facilities. The following details the invention in further detail.

PRIOR ART

It is considered helpful to outline prior art methods used in this field for the purpose of best demonstrating the conceptual enhancement of the present device and method.

Figure 1:
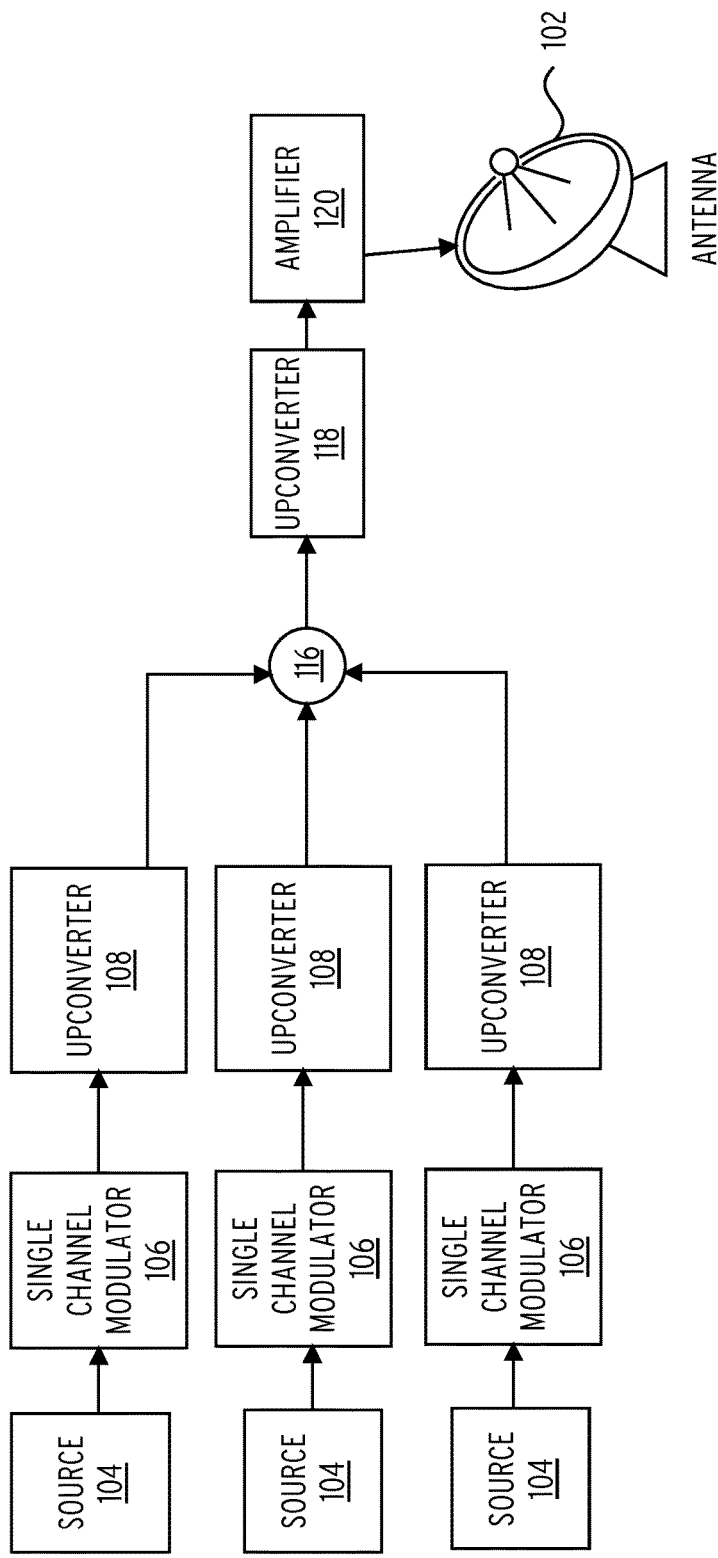
FIG. 1 demonstrates one embodiment of a prior art hardware configuration used in this field, shown for comparative purposes.

Referring first to FIG. 1 there is shown a block diagram of the components involved in one prior art equipment assembly used for the creation of a multi-channel signal for use in satellite broadcasting applications. There are shown a plurality of source signals—in this case three source signals each generated from a corresponding source 104 are shown. The overall idea of these facilities is to create a single output signal at a prescribed bandwidth that carries all of the input signals, which at their input may be at varying frequencies etc.

The prior art approach shown in FIG. 1 next includes a single channel modulator 106 for each source signal and corresponding to each source 104. The single channel modulator 106 will process the source signal from its corresponding source 104 and generate an intermediate signal which can be further handled and incorporated into the multichannel output signal.

Shown next in this Figure are a plurality of upconverter 108 corresponding to each single channel modulator 106— the upconverter 108 will translate the intermediate signal output from the single channel modulator 106 to L-band. The upconverted L-band signals from each upconverter 108 are then combined/summed by a combiner 116. The combined signal from the combiner 116 is then further upconverted by another upconverter 118 for shifting to the final required uplink frequency, and can be amplified by an amplifier 120 and transmitted to a satellite by antenna 102.

Figure 2:
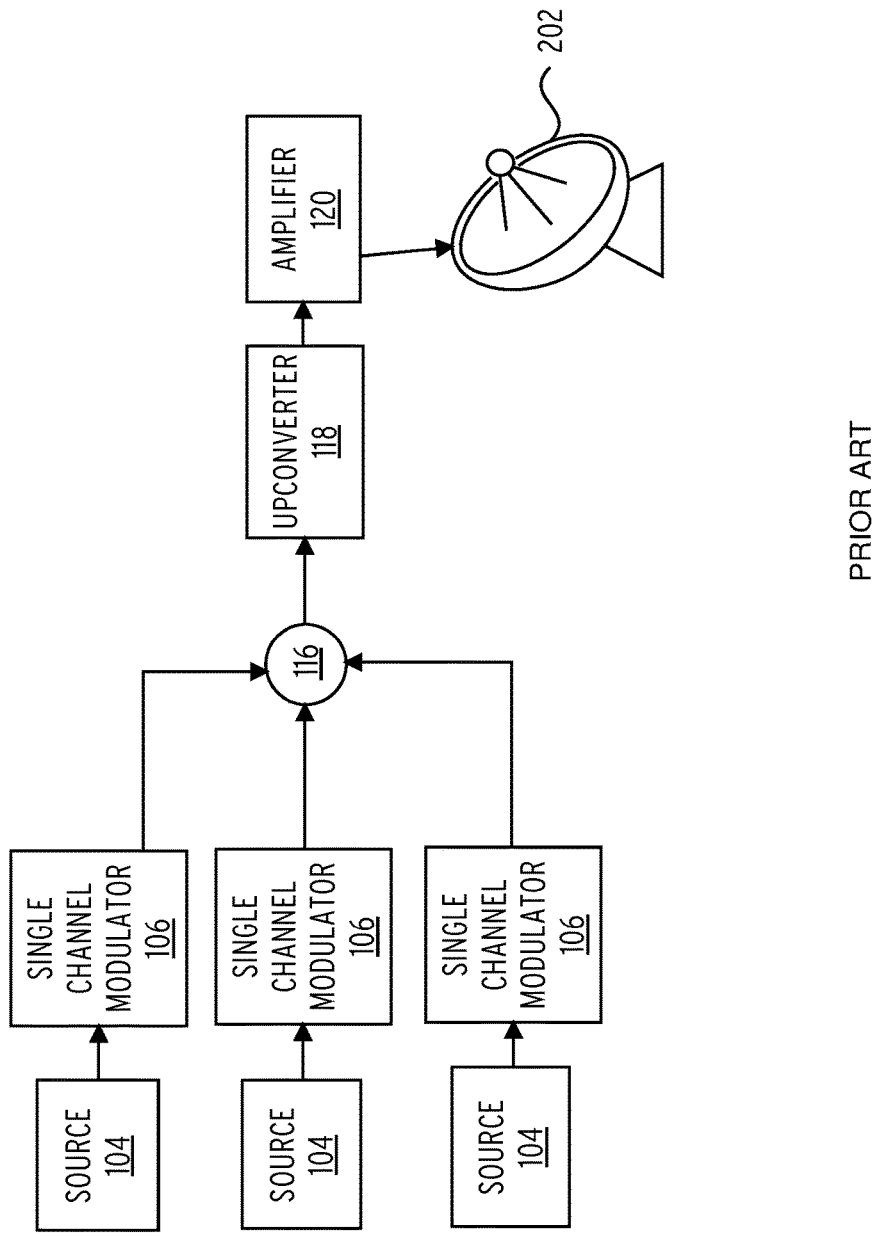
FIG. 2 shows another prior art uplink facility using individual modulators per signal source.

Another prior art approach is seen in the embodiment of FIG. 2 which again shows a single channel modulator 106 for each signal source 104. The single channel modulator 106 used in this embodiment has integrated L-band upconverter 108 into the single channel modulator 106 so that one set of freestanding equipment is removed—the remainder of the embodiment of FIG. 2 is the same as that shown in FIG. 1.

These prior art embodiments of equipment combinations used to create a multi-carrier signal for use in a satellite uplink demonstrate the large numbers of components, cost and complexity used in the assembly of such a signal and the simplicity offered by the simplified single component approach of the present invention can be appreciated by those skilled in the art. Even though the single component approach of the present invention will require more complex circuitry, the cost and space savings and overall decreased operational complexity are believed to be highly commercially desirable attributes of the present invention.

Figure 3:
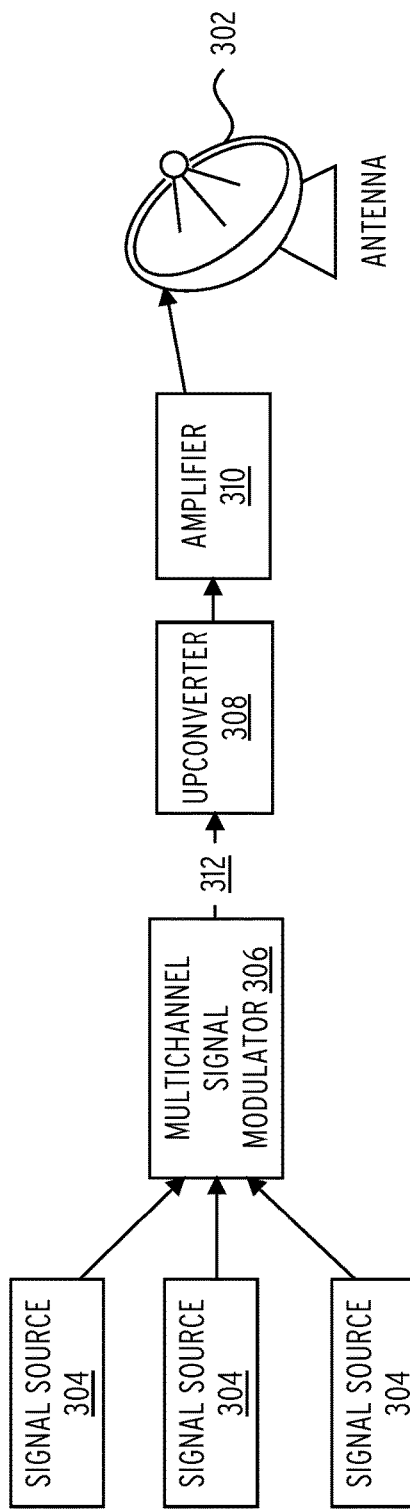
FIG. 3 is a block diagram demonstrating a satellite uplink facility utilizing the multi-channel multichannel signal modulator of the present invention.

Apparatus:

Referring to FIG. 3 there is shown a first block diagram of an embodiment of a satellite uplink system employing a multichannel signal modulator 306 of the present invention. There are three source signals shown each generated from a signal source 304. The number of source signals and signal source 304 connection equipment could vary—any number from two to a larger number which was desired to be combined into a single multichannel signal will be understood, along with the necessary refinements in the equipment, to be covered.

In operation of the system of FIG. 3, a plurality of source signals each from a signal source 304 are fed into the multichannel signal modulator 306 via a plurality of signal inputs. The output signal from the signal output 312, typically at L-band, is then shifted to the final desired output frequency by an upconverter 308, following which it can be amplified by amplifier 310 and applied to the antenna 302 for uplink to the satellite.

Figure 4:
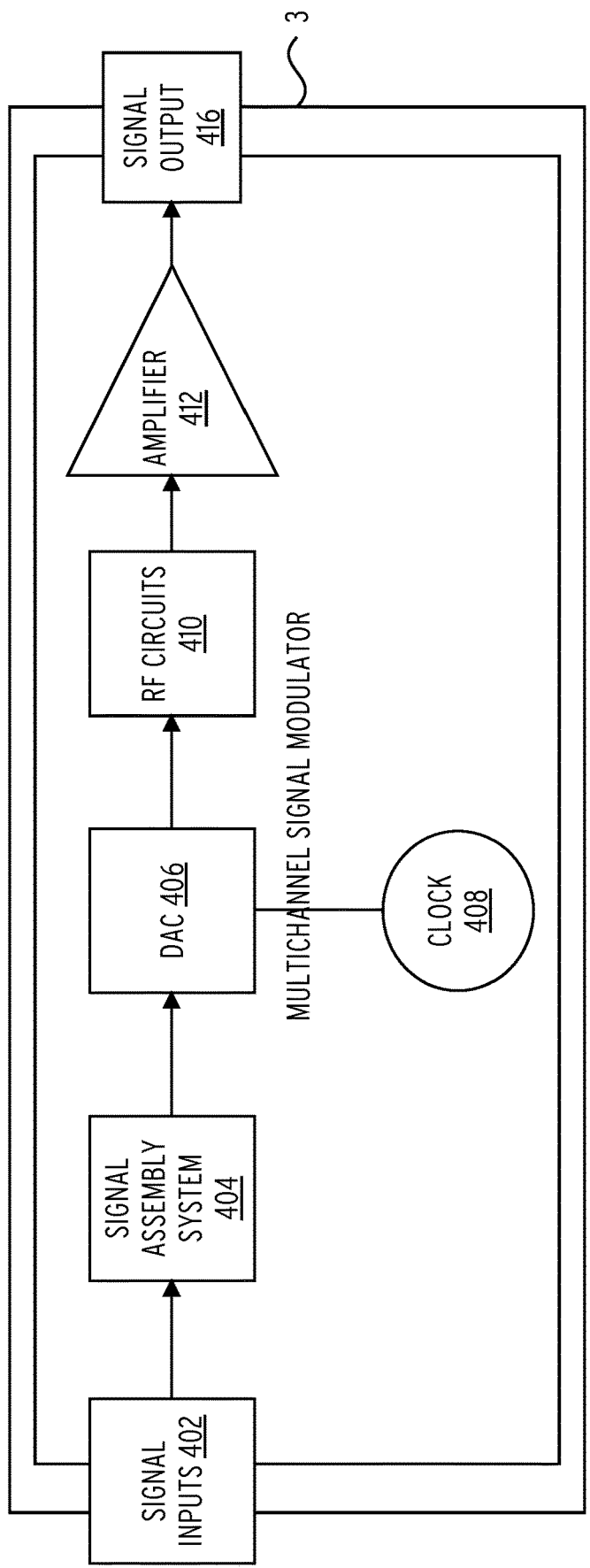
FIG. 4 is a block diagram demonstrating the components of one embodiment of the multichannel signal modulator 306 of FIG. 3.

FIG. 4 is a block diagram demonstrating the general categories of components or subsystems of one embodiment of the multichannel signal modulator 306 of the present invention. First there is shown a plurality of signal inputs 402—each of the signal inputs 402 is a connection capable of receiving a source signal from a signal source. In the Figures shown three source signals each with a related signal source 304 have been shown, but the number of source signal paths could vary and all are contemplated within the scope hereof.

The source signals received via the signal inputs 402 are then fed to the signal assembly system 404 of the multichannel signal modulator 306 where the multichannel signal is assembled. The output of the signal assembly system 404 subsystem is a combined multichannel signal consisting of multiple single carriers represented in a digital fashion. The signal assembly system 404, as detailed elsewhere herein, comprises modulation means operatively connected to the plurality of signal inputs for the modulation of each of the plurality of source signals, wherein following modulation the plurality of source signals is a plurality of modulated signals; and source upsampling means operatively connected to the modulation means for the upsampling of each of the plurality of modulated signals to a common sample rate, wherein following upsampling the plurality of modulated signals is a plurality of upsampled signals. The signal assembly system 404 further comprises frequency mixing means operatively connected to the source upsampling means to combine the plurality of upsampled signals into a unitary signal.

The unitary signal is then fed through a digital to analog converter (DAC), shown at DAC 406. The DAC 406 relies on a clock 408 being an oscillator or other similar device. Following the digital to analog conversion of the unitary signal, it can be filtered by one or more RF circuits 410 and amplified by an amplifier 412 for output. The RF circuits 410 and amplifier 412 comprise final upsampling means whereby the signal output outputs an output signal having multiple channels encoded therein and being at the desired bandwidth.

Figure 5:
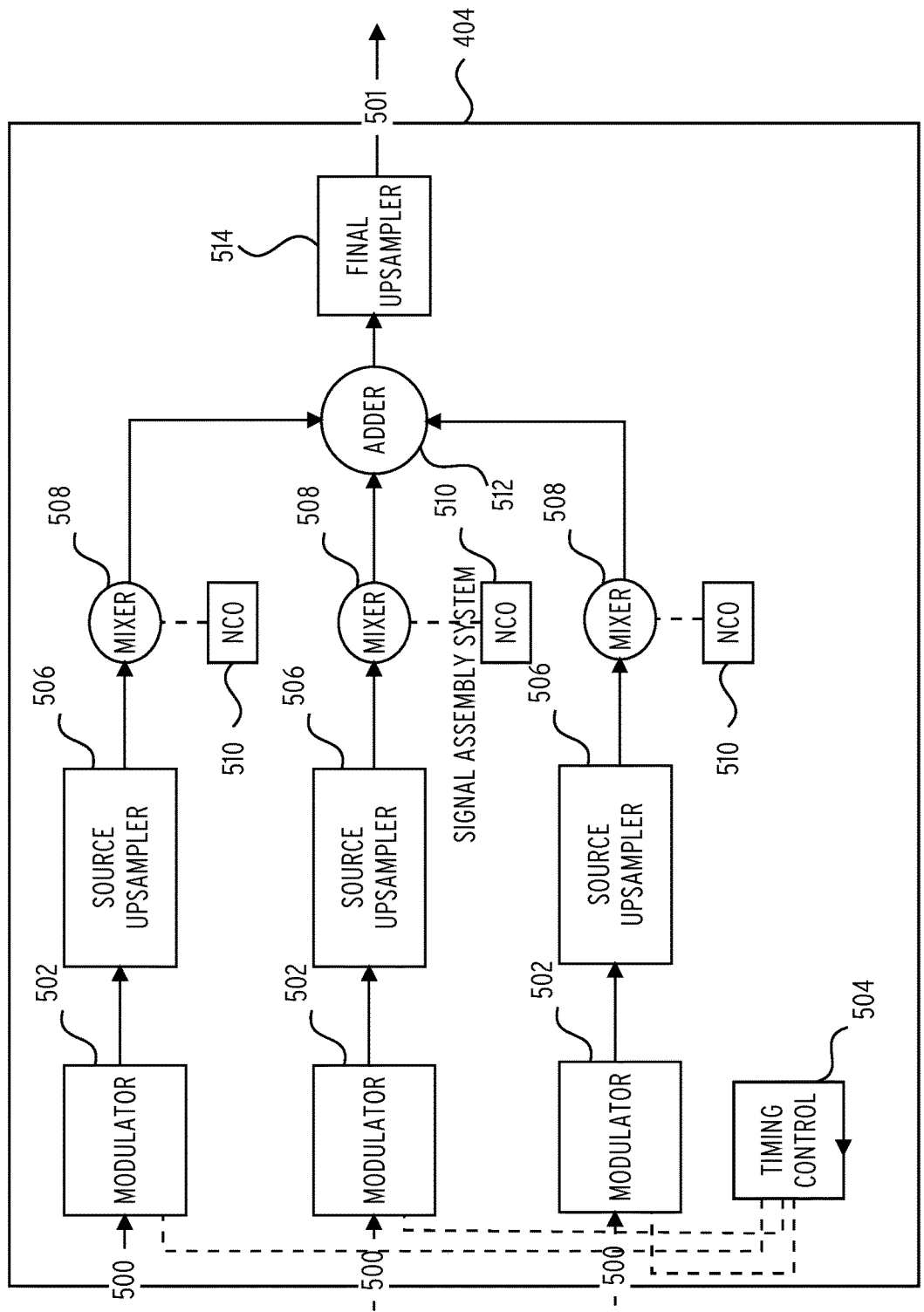
FIG. 5 is a block diagram demonstrating the configuration of one embodiment of the signal assembly system 404 of FIG. 4.
Figure 6:
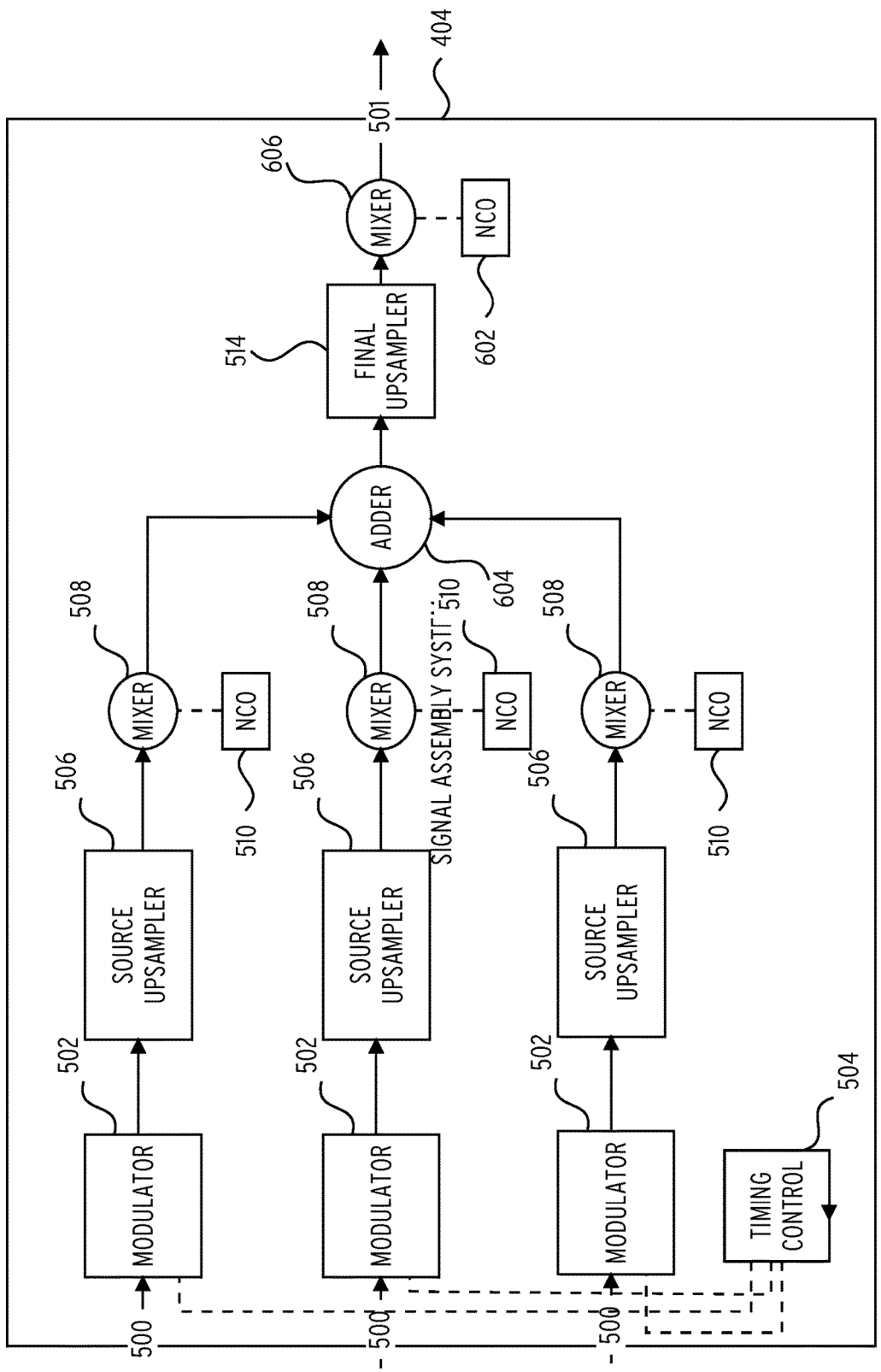
FIG. 6 is a block diagram demonstrating the configuration of one embodiment of the signal assembly system 404 of FIG. 4.

The signal assembly system 404 is shown in more detail in two embodiments in FIGS. 5 and 6. In a first embodiment of the signal assembly system 404 as shown in FIG. 5 there are shown signal paths for a plurality of source signals from a plurality of signal inputs—these are shown at 500. Three incoming source signal paths are shown although different numbers of signals could be incorporated with attendant modifications to the signal assembly system 404 and the remainder of the multichannel signal modulator 306.

Each of the incoming source signals, 500, are received by a digital modulator 502 comprising the modulation means. There is a modulator 502 circuit for each incoming source signal path. Each of the modulator 502 circuits is also connected to a Timing control 504 to control the synchronizations of the modulators together. The modulator 502 will in respect of the connected source signal, groom the source signal, conduct forward error correction, modulation and pulse shaping and amplitude control. The output of the modulators is a multiplier of their symbol rates.

The source signals once processed by their individual modulator 502 comprise modulated signals. The next circuit and process step conducted within the signal assembly system 404 is a source upsampling step conducted by a source upsampler 506. The signal assembly system 404 comprises a source upsampler 506 corresponding to each modulator 502. The source upsampler 506 will upsample the modulated signal from each modulator 502 to a common sample rate for each source signal path. The sample rate is chosen to be sufficient to allow the representation of all the source signals in the required uplink bandwidth. The source upsampler 506 for each modulator 502 increases the sample rate of the processed signal by a rational fraction—the upsamplers 506 may have different rational fractions allowing different symbol rates for each channel and source signal.

Following the upsampling of the individual source signals to a common sample rate, the plurality of upsampled signals are placed relative to each other in frequency using a plurality of mixers—there is a mixer 508, each shown with a corresponding numerical controlling oscillator NCO 510, shown in respect of each source path 500 and each source upsampler 506. An Adder 512 is then shown which combines the frequency mixed plurality of upsampled signals into a unitary signal. Many types of specific circuits could be used both as mixer 508 and Adder 512 circuits, and any digital circuit accomplishing these objectives is contemplated within the scope of the present invention. Finally shown is a final upsampler 514 which will upsample the unitary signal to the desired frequency for a downstream digital to analog converter or other use after the signal output 501.

A final step before the output signal on the signal output 501 would be ready for transmission or uplink would be to conduct a final mixing, encoding or amplification step. The embodiment of the signal assembly system 404 shown in FIG. 6 shows a final mixer 606 with corresponding NCO 602 to receive and further process the multichannel signal for uplink use. It will be understood that the incorporation of these final signal processing components or circuits could be a part of the signal assembly system 404, or could be pre-existing equipment in other facilities and embodiments and both such approaches are contemplated within the scope of the present invention.

The multichannel signal which is yielded by operation of the multichannel signal modulator 306 of the present invention is a multichannel signal at a desired selected bandwidth that can be used in satellite uplink applications. The multichannel signal modulator 306 in a single component processes, upconverts and combines all of the source signals into a multichannel signal output on a signal output 312. The multichannel signal can then be further upconverted, amplified and transmitted using an upconverter 308, an amplifier 310 and an antenna 302 in accordance with conventional methods.

As outlined elsewhere herein, the multichannel signal modulator 306 uses digital circuitry to generate the multichannel signal—although the circuitry is complex, it is simpler in terms of circuitry components required when compared to the quantity of circuits required in prior art approaches using multiple single channel modulator 106 equipment. The digital circuits of the signal assembly system 404 can be implemented in a variety of ways including discrete logic, FPGA and ASICs—all of which along with any other methodology obvious to one skilled in the art of circuit design are contemplated within the scope of the present invention.

The multichannel signal modulator 306 has many benefits beyond space savings. The multichannel signal modulator 306 allows for tight control of frequency synchronization between the multiple source signals incorporated into the multichannel signal and also allows for timing control between the channels as they are all derived from a common reference source. The multichannel signal modulator 306 also allows for control of the relative power between the multiple source signals and plurality of signal sources, as well as the overall absolute power output on the signal output 312 from the multichannel signal modulator 306.

In a further embodiment of the multichannel signal modulator of the present invention, the signal assembly system 404 might use a channelizer in place of the plurality of modulator circuits and plurality of source upsampling circuits. A channelizer is a single circuit component capable of modulating and source upsampling the entire plurality of source signals received via the signal inputs 402 in a single circuit or processing step. The use of a channelizer, and most specifically contemplated a FFT-based channelizer, will be understood to those skilled in the art of signal processing and circuit design and is also contemplated within the scope of the present invention.

Figure 7:
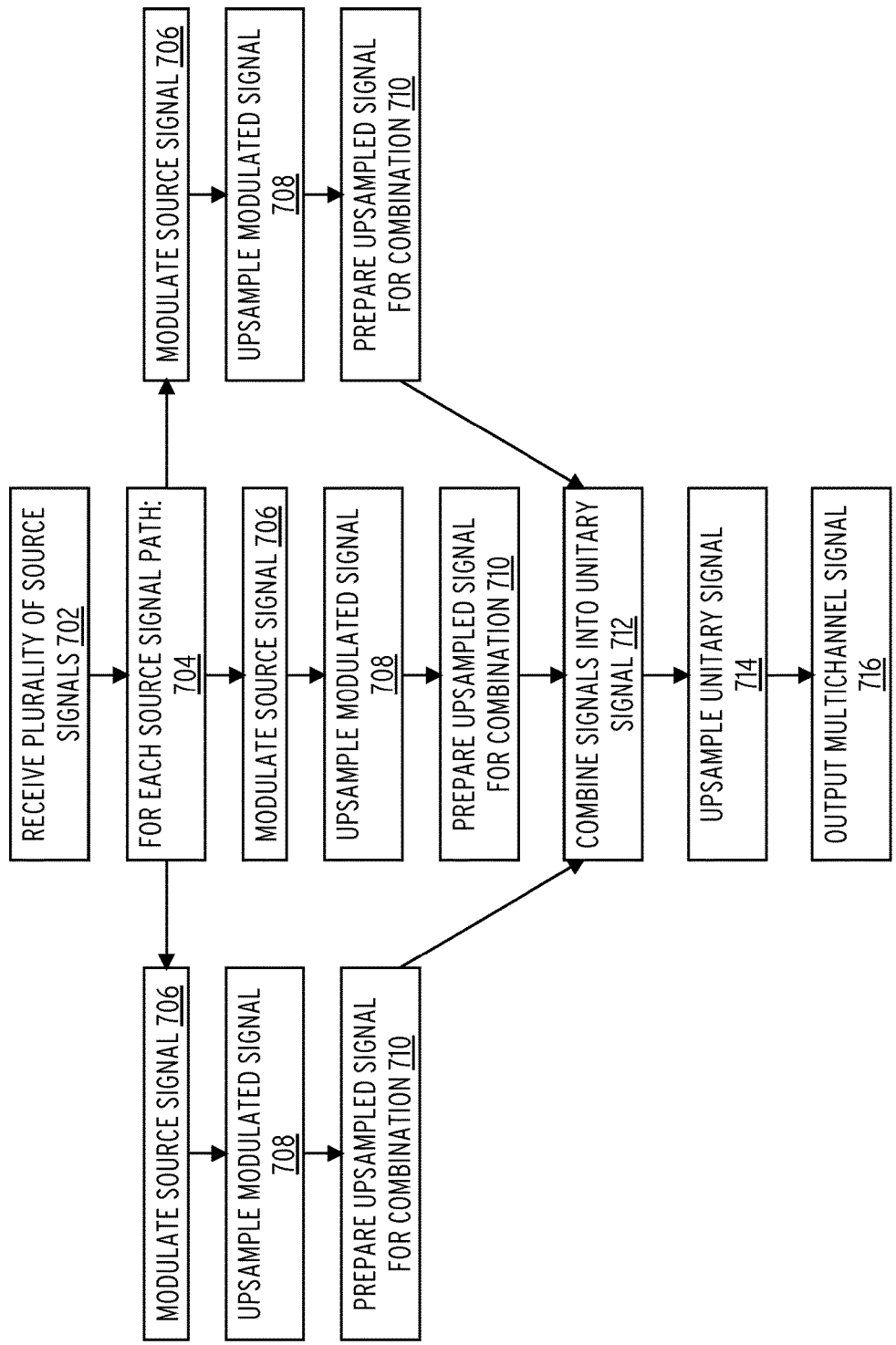
FIG. 7 is a flowchart demonstrating the steps involved in the method of operation of one embodiment of the multichannel signal modulator of the present invention.
Figure 8:
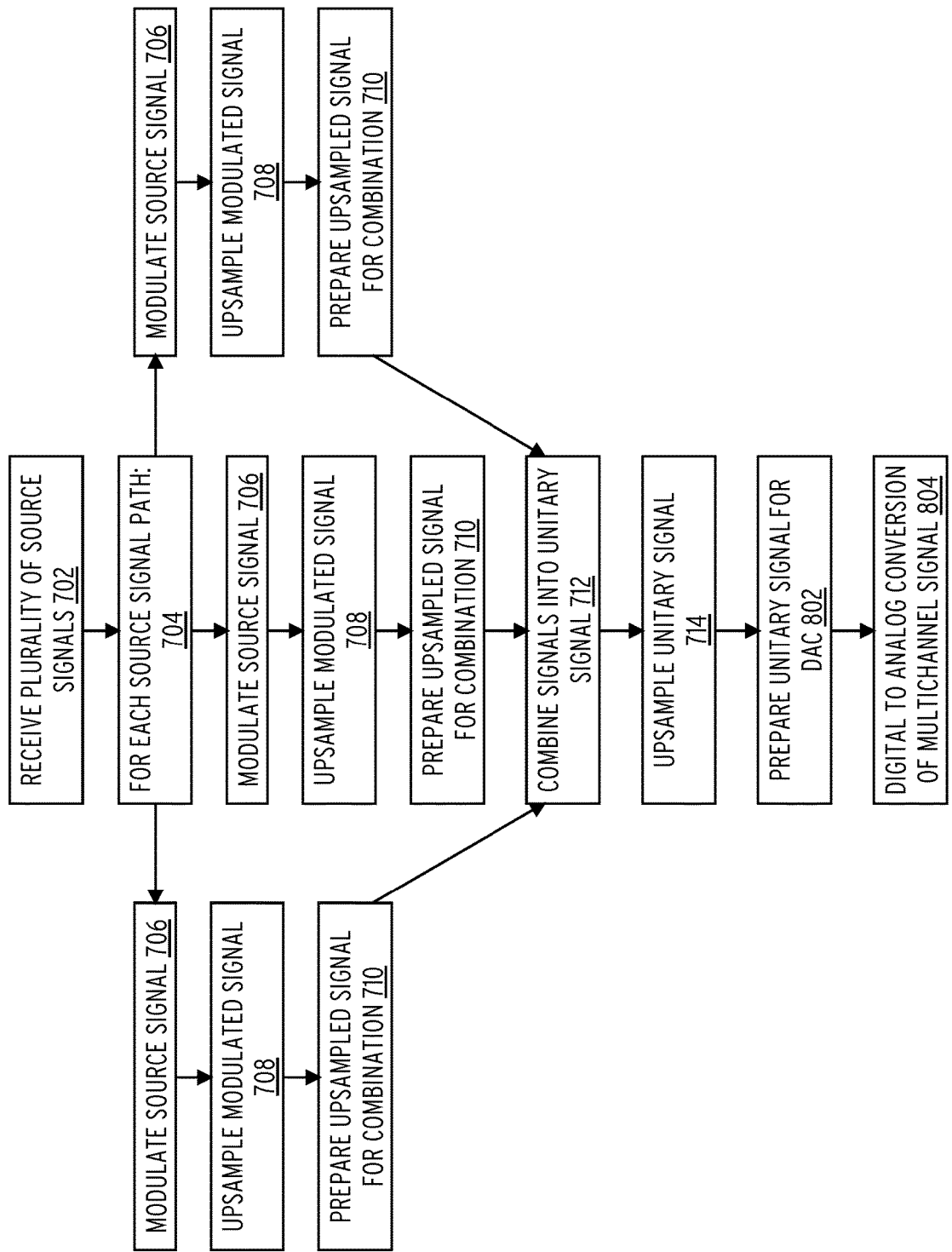
FIG. 8 is a flowchart demonstrating the steps involved in the method of operation of one embodiment of the multichannel signal modulator of the present invention.

Method:

FIGS. 7 and 8 are two flowcharts demonstrating the steps involved in two methods of the creation of a multichannel signal at a selected bandwidth from a plurality of source signals by a multichannel signal modulator in accordance with the present invention, intended to generally speaking demonstrate the operation of the multichannel signal modulator. Referring first to FIG. 7.

The multichannel signal modulator 306 will receive a plurality of source signals 304 via a plurality of signal inputs. This is shown at block 702 in the flowchart. The multichannel signal modulator 306 will then process each incoming source signal by first modulating the source signal using modulation means which in respect of each source signal will likely comprise a modulator circuit. Modulation of the source signal is shown at block 706. The modulated signal from the modulator circuit 502 will then be up sample using a source of sampling circuit 506. Upsampling of the modulated signal into a desired or standardized format for combination into the multichannel signal desired comprises the next step. The source of sampling step is shown at block 708.

Following the upsampling of the modulated signals into a plurality of up sample signals, frequency mixing means are used to combine the plurality of up sample signals into a unitary signal. The frequency mixing means in the case of the embodiment of FIG. 5 for example comprises a plurality of mixing circuits 508 and a combiner or adder circuit 512. Block 710 in the Flow chart shows the preparation of the up sample signals for combination. This is the mixing or other preparation of the individual modulated and up sample signals for combination together or alongside each other in the final multichannel signal. The adder circuit 512 combines the plurality of up sample and further prepared signals into a unitary signal. This is shown at block 712. The same method steps would be undertaken, culminating in the combination step at block 712, for each of the source signal paths.

Following the combination of the up sample signals into a unitary signal, shown at block 712, the unitary signal can then be further up sample to yield the desired multichannel signal at the selected and with. This is shown at block 714. The finished multichannel signal is then output from the multichannel signal modulator 306 on a signal output, shown at block 716.

By modulating and processing the multiple source signals in digital format, the development of a single signal processing or assembly system to process a plurality of incoming source signals is simplified.

The second embodiment of a method in accordance with the present invention, shown in FIG. 8, includes the same initial steps for the operation of the multichannel signal modulator 306, through to the up sampling of the unitary signal at block 714. At the end of the method of the second flowchart, the signal assembly system 404 has further circuitry and components to enable the preparation of the unitary signal for digital to analog conversion, shown at block 802. The modulator 306 could then conduct a digital to analog conversion of the multichannel signal, shown at block 804, such that an analog signal versus a digital signal could be output on the signal output either for further processing downstream or transmission or uplink etc. Both of these method flowcharts are provided simply to provide a general understanding of the operation of the signal assembly system 404 and the modulator 306 of the present invention. It will be understood by those skilled in the art of signal processing and circuit design that modifications could be made to the circuitry of the modulator 306 or the signal assembly system 404 as well as to the remainder of the components used in that modulator 306 which would aid in the accomplishment of the same method and in the same behavior of the modulator 306 and that any such changes again are contemplated within the scope of the present invention.

It will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A multichannel signal modulator for use in the digital generation of a unitary multichannel signal at a selected bandwidth from a plurality of source signals, said multichannel signal modulator being a device comprising:

a plurality of signal inputs each comprising a device connection for reception of a separate source signal from a signal source;

a signal assembly system, comprising:

modulation means, namely a plurality of modulator circuits corresponding to the plurality of source signals and each operatively connected to one of the plurality of signal inputs for the modulation of the corresponding source signal, wherein following modulation by the plurality of modulator circuits the plurality of source signals is a plurality of modulated signals;

source upsampling means, namely a plurality of source upsamplers corresponding and operatively connected to each of the plurality of modulator circuits and each capable of upsampling the related modulated signal to an upsampled signal at at least one selectable sample rate shared with each of the other of the plurality of source upsamplers, whereby in operation upon selection of a selected common sample rate from the available selectable sample rates selected to allow representation of each of the plurality of source signals in the ultimately completed unitary multichannel signal at the selected bandwidth, each source upsampler will yield an upsampled signal at the selected common sample rate;

frequency mixing means, namely a frequency mixer operatively connected to the source upsampling means to receive and combine the plurality of upsampled signals into a unitary signal; and final upsampling means, namely a final upsampler operatively connected to the frequency mixer for the upsampling of the unitary signal into a unitary multichannel signal at the selected bandwidth; and a signal output for output of said unitary multichannel signal from the signal assembly system at the selected bandwidth;

wherein in operation the signal assembly system will:

modulate each source signal received via its corresponding modulator circuit into a modulated signal;

select a selected common sample rate for use by the source upsamplers from the at least one available selectable sample rate;

upsample each modulated signal at the selected common sample rate into an upsampled signal, via the source upsampler corresponding to the corresponding modulator circuit;

using the frequency mixer, mix the plurality of upsampled signals into a unitary signal; and format the unitary signal into the desired final unitary multichannel signal at the selected bandwidth using the final upsampler for output via the signal output, wherein the final unitary multichannel signal contains a representation of all of the source signals by virtue of the selection and application of the appropriate selected common sample rate.

2. The multichannel signal modulator of claim 1, further comprising a digital-to-analog converter between the final upsampler and the signal output, where in operation of the multichannel signal modulator the multichannel signal will be converted from its digital creation format to an analog format for further processing or transmission.

3. The multichannel signal modulator of claim 1, wherein the plurality of source signals are at different frequencies.

4. The multichannel signal modulator of claim 1 wherein the modulation of the plurality of modulator circuits, in respect of each source signal, comprises at least one of:
grooming the source signal;
application of forward error correction to the source signal;
modulation of the source signal;
pulse shaping of the source signal; or
amplitude control of the source signal.

5. The multichannel signal modulator of claim 1 further comprising a timing control circuit operatively connected to the plurality of modulator circuits, to synchronize the modulation of the plurality of source signals.

6. The multichannel signal modulator of claim 1 wherein the source upsampler comprises a plurality of source upsampling circuits corresponding to the plurality of modulated signals, each source upsampling circuit for upsampling of an individual modulated signal from the modulation means.

7. The multichannel signal modulator of claim 1 wherein the frequency mixer comprises at least one mixing circuit operable to place the plurality of upsampled signals relative to each other in the unitary signal.

8. The multichannel signal modulator of claim 7 wherein the at least one mixing circuit is a plurality of mixing circuits corresponding to the plurality of upsampled signals.

9. The multichannel signal modulator of claim 8 wherein the frequency mixer further comprises a signal adder for summing the outputs of the plurality of mixing circuits into the unitary signal.

10. The multichannel signal modulator of claim 8, wherein each of the plurality of mixing circuits further comprises a numerically controlled oscillator.

11. The multichannel signal modulator of claim 1 further comprising signal transmission means, namely a signal transmitter for the transmission of the multichannel signal at the selected bandwidth to a receiver.

12. The multichannel signal modulator of claim 11, wherein the signal transmitter amplifies the multichannel signal before transmission to the receiver.

13. The multichannel signal modulator of claim 11 wherein the signal transmitter shifts the multichannel signal to a final output frequency before transmission to the receiver.

14. The multichannel signal modulator of claim 1 wherein the source upsampler and the frequency mixer comprise a channelizer.

15. The multichannel signal modulator of claim 14, wherein the channelizer comprises a Fast Fourier Transform (FFT) channelizer.

* * * * *